March 23, 1948.  C. H. STEWART  2,438,234
ROTATABLY ADJUSTABLE PIPE JOINT
Filed June 9, 1944

INVENTOR.
CHARLES H. STEWART
BY
Hogues Neary & Campbell
his ATTORNEYS

Patented Mar. 23, 1948

2,438,234

UNITED STATES PATENT OFFICE 2,438,234

ROTATABLY ADJUSTABLE PIPE JOINT

Charles H. Stewart, Wilmington, Del.

Application June 9, 1944, Serial No. 539,449

1 Claim. (Cl. 285—135)

This invention relates to pipe couplings and relates particularly to a rotatable pipe coupling whereby one pipe member may be adjusted rotatably with respect to another pipe element to which it is coupled without leakage of liquid at the coupling.

Many different forms of devices have been provided heretofore for permitting the rotary adjustment of one pipe element relatively to another. Such devices usually are relatively complicated and are provided with gaskets and coupling elements for compressing the gasket in order to afford a liquid-tight seal between the elements. All of these prior devices require non-standard parts, that is, either the pipe elements must be modified to receive the coupling or the coupling element is not adapted for use with other standard elements commonly used in conduit systems.

The present invention has as an object the provision of a rotary pipe coupling by means of which an effective seal can be obtained between a standard pipe and a standard elbow.

Another object of the present invention is to provide a rotatably adjustable pipe coupling involving the use of a standard pipe elements in which sealing elements and gaskets may be secured to one of the elements to provide a liquid-tight seal between the elements, regardless of their relative angular adjustment.

Other objects of the invention will become apparent from the following description of a typical form of device embodying the present invention.

In accordance with the present invention, a typical form of device includes a standard internally threaded elbow which is adapted to engage the threaded end of a standard pipe in the usual way. A collar telescopically related to the pipe is secured to the elbow and this collar is so related in internal diameter to the pipe that space is left for receiving an annular packing. The collar is provided with an internal shoulder against which the packing may be compressed by means of a sleeve which is carried by the collar and is connected thereto by an adjusting means so that the packing can be compressed and expanded into sealing relationship with the pipe and the collar or relieved of pressure to permit rotary adjustment of the elbow.

Figure 1:
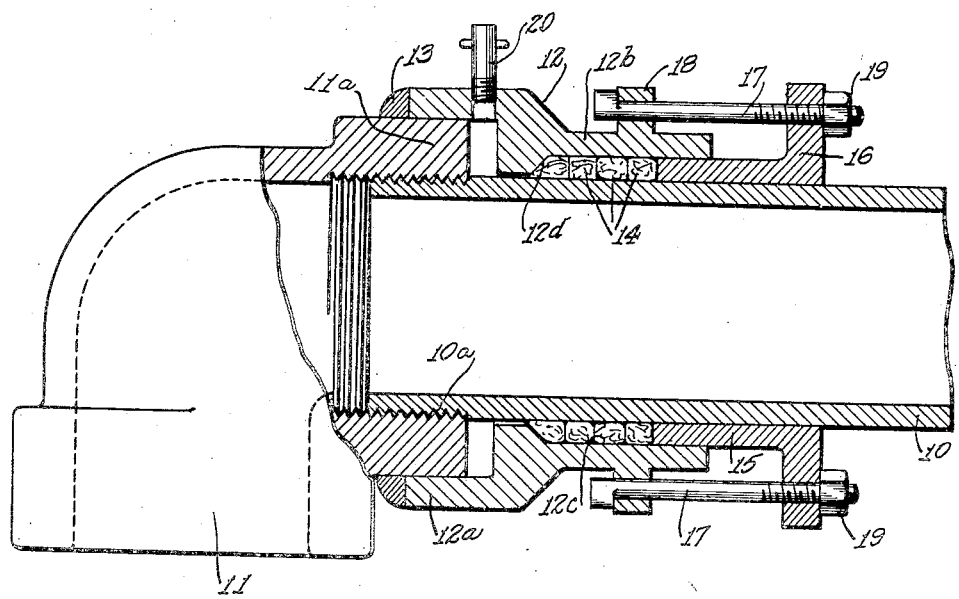
Figure 2:
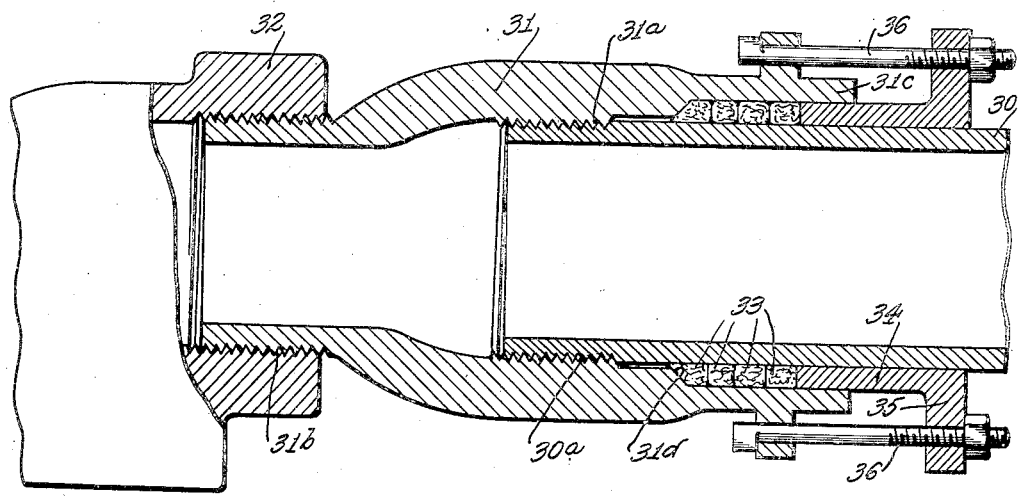

For a better understanding of the present invention, reference may be had to the accompanying drawing in which:

Figure 1 is a view in longitudinal section of a typical form of swing elbow coupling embodying the present invention; and Figure 2 is a view in longitudinal section of a modified form of adjustable coupling.

The form of the invention illustrated in Figure 1 may be applied to a standard form of pipe 10 and elbow 11. The elbow 11 is threaded on a threaded end portion 10a of the pipe 10 in the usual way. The elbow 11, therefore, is rotatable with respect to the pipe, but if loosened by rotation, will permit leakage at the threads.

In order to prevent leakage between the pipe 10 and the elbow 11, I have provided an annular collar 12 having a flanged portion 12a at one end thereof which fits snugly over the flange 11a on the elbow 11 and is secured thereto by a welded or sweated seam 13 or in any other desired way. The collar 12 is provided with another annular portion 12b of somewhat reduced external diameter, but having an internal diameter greater than the external diameter of the pipe 10, thereby providing a space 12c for receiving the packing 14. The collar 12 is provided with an inwardly tapered shoulder 12d which limits the inward movement of the packing 14 and upon compression of the packing urges the latter into sealing engagement with the pipe 10.

The packing 14 may be compressed by means of an annular sleeve member 15 which is received in the space 12c and encircles the pipe 10. The sleeve 15 is carried by a ring member 16 which may be secured thereto or formed integrally therewith and is connected to the collar 12 by means of a plurality of bolts 17. The heads of the bolts are disposed behind suitably drilled lugs 18 projecting from the collar and the nuts 19 on the bolts bear against the ring 16 so that by adjustment of the nuts, the sleeve 15 may be moved axially of the pipe to compress the packing or relieve pressure thereon.

The device may be further provided with a fitting 20 for receiving a grease gun to permit injection of grease into the coupling to facilitate rotation of the elbow and to reduce leakage between the elbow 11 and the pipe 10. The swing joint or elbow 11 may be applied readily to a pipe of the proper size by sliding the elbow with the collar and the adjusting sleeve over the end of the pipe and screwing the elbow onto the pipe into the desired angular relationship. Thereafter, the nuts 19 may be tightened to compress the packing 14. The angular relationship of the elbow 11 can be changed by loosening the nuts 19 slightly, rotating the assembly and again tightening the nuts.

A modified form of coupling is illustrated in Figure 2. This form of coupling is suitable for use either with an elbow or for coupling two pipes together with capacity for relative rotation. In this form of device, the end of the pipe 30 is provided with threads 30a in the usual manner, these threads engaging with complemental threads 31a in the tubular collar member 31. The collar member 31 can be of any desired length and, as illustrated, may be provided with a threaded end portion 31b for receiving an elbow 32 or an internally threaded sleeve coupling (not shown). The opposite end of the coupling member 31 is provided with a collar 31c of larger internal diameter than the external diameter of the pipe 30, thereby providing space for the packing 33. The collar 31c also has an inclined shoulder 31d therein for the purpose described above. Associated with the member 31 is a packing compressing sleeve 34 having the ring 35 secured thereto and the adjusting elements or bolts 36 connecting the sleeve 34 to the collar 31. This device is utilized in the same manner as the swing elbow disclosed in Figure 1 and can be adjusted rotatably through substantially any desired angle.

It will be clear from the description of typical forms of the invention that the pipes and elbows do not require special treatment for use with my improved coupling, that is, the pipes and elbows may be threaded in the usual way and do not require extra abutment flanges or shoulders for engagement with the packing or coupling elements. Therefore, the application of my rotary coupling is greatly facilitated and the cost involved in providing such rotary coupling is considerably decreased.

It will be understood that the invention is adapted for use with substantially any size pipe or elbow and that modifications in the shape and size of the parts of the device, therefore, may be made without departing from the invention. The forms of the invention described above should be considered as illustrative and not as limiting the scope of the following claim.

I claim:

A rotatable joint comprising a first pipe member having a threaded portion, a second pipe member adapted to be threaded thereon and adjusted rotatably with respect to said first pipe member, a collar united rigidly with and in airtight relation to said second pipe member having an internal diameter larger than the external diameter of said first pipe member providing a space therebetween for receiving packing, an internal shoulder in said collar, an annular sleeve fitting in said space and means connecting said sleeve and said collar for adjusting them relatively in an axial direction to compress said packing against said internal shoulder and expand it against said sleeve and said first pipe member.

CHARLES H. STEWART.

REFERENCES CITED

The following references are of record in the file of this patent:

UNITED STATES PATENTS

| Number | Name | Date |
|---|---|---|
| 646,011 | Sterling | Mar. 27, 1900 |
| 1,059,671 | Holt | Apr. 22, 1913 |
| 1,146,670 | Tippett | July 13, 1915 |
| 2,338,686 | Gredell | Jan. 4, 1944 |